United States Patent [19]

Motoyama

[11] Patent Number: 5,710,967
[45] Date of Patent: Jan. 20, 1998

[54] APPARATUS WHICH INDICATES TO A USER THE PROPER PLACEMENT OF PAGES TO BE SCANNED

[75] Inventor: Tetsuro Motoyama, Santa Clara, Calif.

[73] Assignees: Ricoh Company, Ltd., Tokyo, Japan; Ricoh Corporation, San Jose, Calif.

[21] Appl. No.: 679,113

[22] Filed: Jul. 12, 1996

[51] Int. Cl.⁶ .................................................. G03G 15/00
[52] U.S. Cl. ........................ 399/377; 355/75; 399/371; 399/379; 399/17
[58] Field of Search .................... 399/370, 371, 399/376, 389, 391, 393, 16, 17, 23, 367, 377, 379, 365; 355/75

[56] References Cited

U.S. PATENT DOCUMENTS

| | | | |
|---|---|---|---|
| 3,674,363 | 7/1972 | Baller et al. | 399/17 |
| 4,260,248 | 4/1981 | Murata et al. | 355/60 |
| 4,436,402 | 3/1984 | Seimiya et al. | 399/377 |
| 4,675,741 | 6/1987 | Shinohara | 358/480 |
| 5,172,178 | 12/1992 | Oushiden et al. | 399/86 |
| 5,311,248 | 5/1994 | Iwata | 355/61 |
| 5,385,341 | 1/1995 | Yamada et al. | 271/4.01 |

FOREIGN PATENT DOCUMENTS

| | | |
|---|---|---|
| 57-40940 | 3/1982 | Japan. |
| 57-40968 | 3/1982 | Japan. |
| 57-133043 | 8/1982 | Japan. |
| 59-156260 | 10/1984 | Japan. |
| 60-91345 | 5/1985 | Japan. |
| 64-17542 | 1/1989 | Japan. |
| 2-262136 | 10/1990 | Japan. |
| 5-53213 | 3/1993 | Japan. |
| 5-100326 | 4/1993 | Japan. |

*Primary Examiner*—Matthew S. Smith
*Attorney, Agent, or Firm*—Oblon, Spivak, McClelland, Maier & Neustadt, P.C.

[57] ABSTRACT

A scanning mechanism which indicates to a user the manner of setting a page in order for the page to be properly scanned. When an automatic document feeder is not being used, a paper orientation indicator which is next to a transparent contact surface is illuminated, depending on the orientation of the input paper onto which an image is to be copied. The orientation indicator is located on a periphery of the paper support surface. The orientation indicator is located either at a corner of the transparent contact surface or centered at an edge of the transparent contact surface, depending on how the page to be scanned should be set on the transparent contact surface. Alternatively, an automatic document feeder is utilized with a copier and the automatic document feeder contains both an orientation indicator and paper position indicators which are illuminated to indicate where to place a stack of pages which are to be fed by the automatic document feeder.

23 Claims, 7 Drawing Sheets

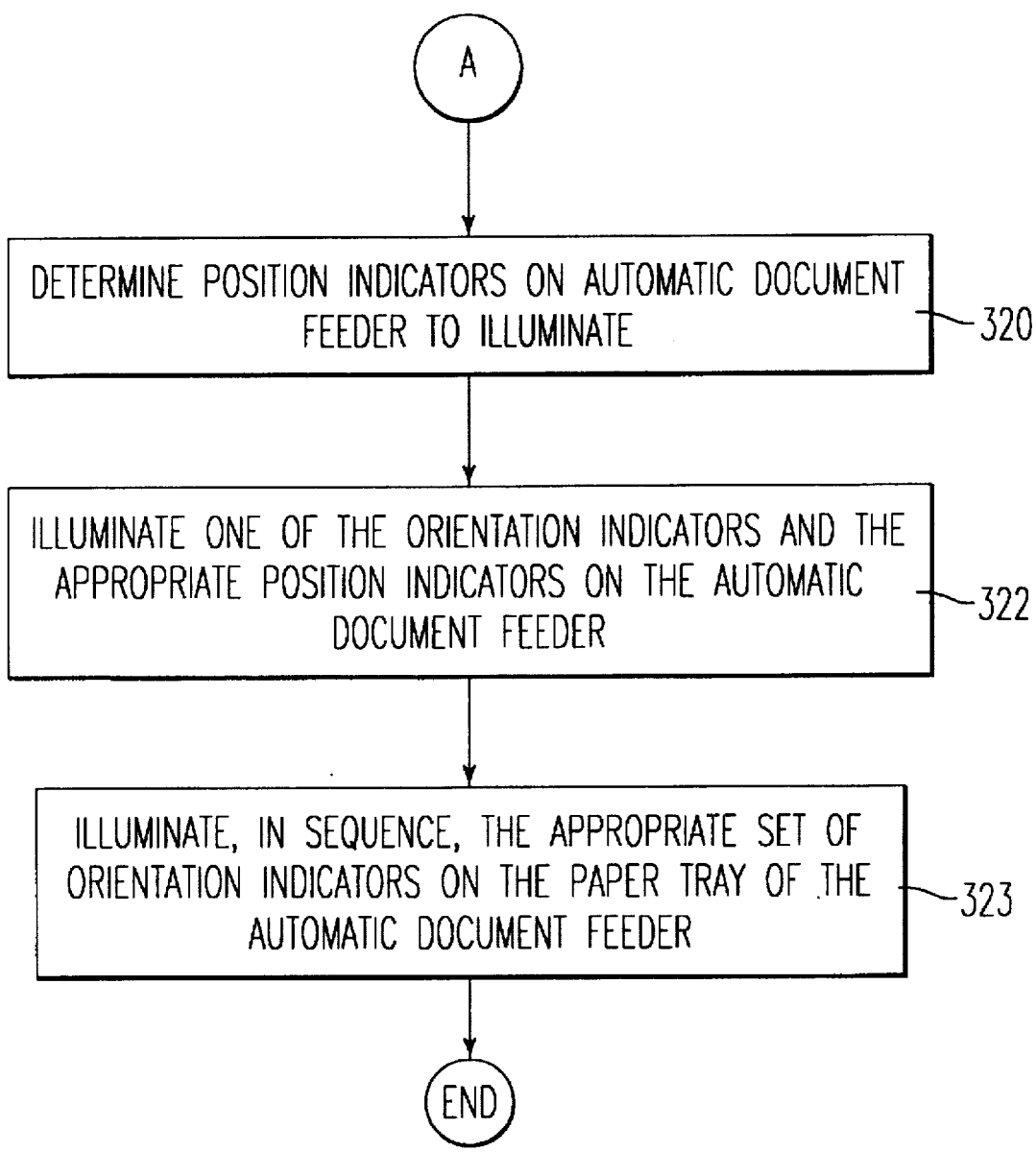

APPARATUS WHICH INDICATES TO A USER THE PROPER PLACEMENT OF PAGES TO BE SCANNED

BACKGROUND OF THE INVENTION

1. Field of the Invention

The present invention relates to an apparatus and method which indicate the proper placement of pages to be scanned. The invention is more particularly related to an apparatus having a paper orientation indicator on a working or paper support surface of a device having a scanner such as a photocopier. The invention is also related to an automatic document feeder containing indicators which indicate a proper placement on the automatic document feeder tray of the pages to be scanned.

2. Discussion of the Background

The present inventor has recognized that users of copier machines sometimes have trouble placing pages to be copied at a correct position and orientation. It was observed that users, on occasion, would place pages to be copied both at an improper orientation and at a wrong position on the copier and waste resulted from the making of improper copies. This problem occurs both when the user places the pages to be copied directly onto the contact glass and when an automatic document feeder is used to feed pages to the contact glass of the copier.

Others have attempted to solve the problem of improper placement by indicating proper placement of pages to be scanned. However, these attempts have not succeeded in providing users with a clear and simple indication of the proper orientation of a page to be scanned nor have they shown how to place pages onto an automatic document feeder, when different orientations and paper positions are possible.

SUMMARY OF THE INVENTION

Accordingly, it is an object of the invention to provide a novel manner of indicating on a paper support surface how a user is to orient the page to be scanned. It is a further object of the invention to provide an automatic document feeder which automatically indicates the proper placement of pages to be fed which are placed on a tray of the automatic document feeder. It is a further object of the invention for the indicator on the automatic document feeder to indicate the orientation of the pages to be scanned. It is yet another object of the invention to provide a plurality of indicators on the automatic document feeder which indicate different positions to place edges of the pages to be scanned, depending on the input or blank paper onto which the image is printed.

These and other objects are accomplished by a scanning system implemented in a device such as a copier which has a paper orientation indicator on a working or paper support surface. The paper orientation indicator indicates how a user is to orient the page to be scanned which is placed by the user on the glass or contact surface of the copier.

The paper orientation indicator is preferably implemented using one or more light emitting diodes (LEDs), backlit liquid crystal displays (LCDs), incandescent light bulbs, or any other device which can conveniently indicate how to orient the page to be scanned. The paper orientation indicator indicates whether the longer side of the paper is to extend in an up-down or vertical direction (a portrait orientation) or whether the longer length of the page to be scanned is to extend in a side-to-side direction (landscape orientation).

When a page to be scanned needs to be aligned with two perpendicular edges of the contact glass, the paper orientation indicator is preferably placed at the corner where the corresponding edges of the contact glass meet. Alternatively, when the page to be scanned is to be centered at one edge of the contact glass, the paper orientation indicator is located proximate to the central position of an edge of the contact surface.

In addition to using the paper orientation indicator, a plurality of illuminatable indicators are placed at one or two edges of the contact glass and indicate where the edges of the page to be scanned should be placed. Depending on a source of the input or blank paper onto which copies are to be made, the appropriate orientation indicator and paper position indicators are illuminated in order to clearly show to a user how the page to be copied should be positioned.

In another embodiment, an automatic document feeder contains a plurality of illuminatable indicators which indicate a proper placement on the tray of the document feeder of the pages to be scanned. The plurality of illuminatable indicators include an orientation indicator and/or indicators showing the proper placement of the edges of the pages to be scanned.

The orientation indicators are placed either on a paper support tray or at another position on the automatic document feeder. A plurality of portrait orientation indicators can be used in conjunction with a plurality of landscape orientation indicators. The plurality of orientation indicators can be used to signify a feed direction of the pages into the automatic document feeder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A has overlapping indicators and FIG. 1B has non-overlapping indicators;

FIGS. 8A and 8B illustrate a flowchart of the operation of the invention; and

DESCRIPTION OF THE PREFERRED EMBODIMENTS

Figure 1A:
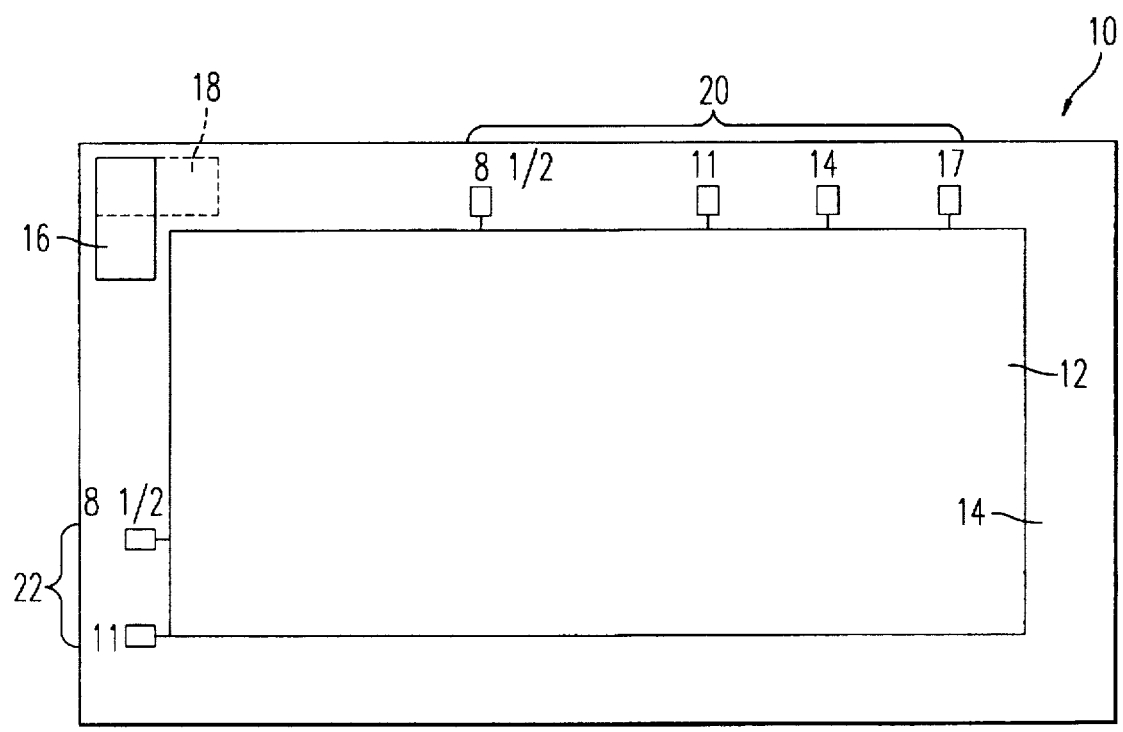
FIGS. 1A and 1B illustrate paper support surfaces for a copier for which pages to be scanned are aligned with the upper left-hand corner of the contact glass.

Referring now to the drawings, wherein like reference numerals designate identical or corresponding parts throughout the several views and more particularly to FIG. 1A thereof, there is illustrated a working or paper support surface 10 utilized by the invention. The paper support surface 10 includes a transparent contact surface 12 such as glass, plastic, or other transparent material through which light passes in order to scan a page which is placed thereon. Surrounding the transparent contact surface 12 is a periphery 14 which is preferably an opaque surface such as plastic, metal, or other material, which surrounds the transparent contact surface 12. The periphery 14 is preferably planar with the transparent contact surface 12 so that should a piece of paper to be scanned extend beyond an edge of the transparent contact surface 12, the edge will be supported by the periphery 14, although this is not required. As both the periphery 14 and the transparent contact surface 12 can be used to support a piece of paper which is to be scanned, the transparent contact surface 12 and the periphery 14 make up the paper support surface 10.

When a page is to be scanned through the transparent contact surface 12, the page is placed face-down on the transparent contact surface 12 so that a corner of the page aligns with the upper-left corner of the transparent contact surface 12. As an alternative to aligning with the upper-left corner of the transparent contact surface 12, the paper support surface and scanner used therewith may permit the page to be scanned to be aligned with any of the four corners of the transparent contact surface 12. The alignment of a corner of a page with a corner of the contact glass is referred to as a corner anchor method or corner anchor position. As a further alternative, instead of aligning the page with one of the corners, the page will be aligned with a central portion of one of the edges of the transparent contact surface 12, also referred to as the center anchor method or center anchor position.

In FIG. 1A, there are two paper orientation indicators illustrated; a first paper orientation indicator 16 illustrates a first paper orientation and a second paper orientation indicator 18, illustrated using broken lines, shows a second paper orientation. The orientation indicators 16 and 18 are miniature representations of how a user should place a page on the transparent contact surface in order for the page to be properly scanned.

The indicator 16 corresponds to a portrait orientation of a page to be scanned which has the edges of the page which extend in an up-down orientation longer than the edges which extend side-to-side. The indicator 18 is in a landscape orientation which has the edges running from side-to-side longer than the edges extending in an up-down orientation.

In FIG. 1A, the indicators 16 and 18 are illustrated as overlapping and the indicator 16 is illuminated. When the indicator 18 is illuminated, the indicator 16 will not be illuminated. Additionally, the orientation indicators 16 and 18 illuminate either the periphery of the illustrated rectangles or the entire rectangle, as desired.

The orientation indicators 16 and 18 are illuminated, when appropriate, using any type of mechanism including light emitting diodes (LEDs) driven by known LED driving circuitry. Alternatively, the indicators 16 and 18 are implemented using a liquid crystal display (LCD) made up of a plurality of indicators. The indicators can be composed of pixels in a dot matrix format, or alternatively to have the portrait and landscape shapes illustrated in FIG. 1A without using individual pixels. The LCDs are preferably backlit in order to clearly illuminate the desired shape. Alternatively, incandescent light bulbs or any other desired form of indicators and lighting can be used to construct the orientation indicators 16 and 18. A possible implementation of the orientation indicators includes cutting out the desired shape from the periphery 14. The cut-out shapes are either overlapping or nonoverlapping, as desired. Also, while FIG. 1A illustrates the upper left hand corner of the transparent contact surface 12 as the corner which is to be aligned with the original page to be copied, any of the other corners may be utilized as an anchor position to which a corner of the document to be scanned is to be aligned.

In addition to including the paper orientation indicators 16 and 18 in FIG. 1A, there are also two sets of indicators 20 and 22 which indicate where to place the edges of the page to be copied, depending on the input paper which is to be utilized to generate the copy. For example, if the paper to be utilized for the copy operation is 8½ by 11 inches and has a portrait orientation, the indicator 8½ of section 20 and the indicator 11 of section 22 will be illuminated along with the orientation indicator 16. To the contrary, if the paper is 11 by 8½ and is arranged in the landscape format, the 11 indicator of the indicators 20 and the 8½ indicator of the indicators 22 along with the paper orientation indicator 18 is illuminated.

The indicators making up the indicator sets 20 and 22 are preferably implemented by LEDs. These indicators may be simply square or rectangular boxes next to the appropriate paper size, as illustrated in FIG. 1A. Alternatively, instead of having a separate illuminatable indicator, the illuminatable indicator might be the number itself. The indicators in the sets 20 and 22 can be made of LEDs, LCDs which are backlit, incandescent light bulbs, or any other desired illuminatable or other type of changeable indicators.

Figure 1B:
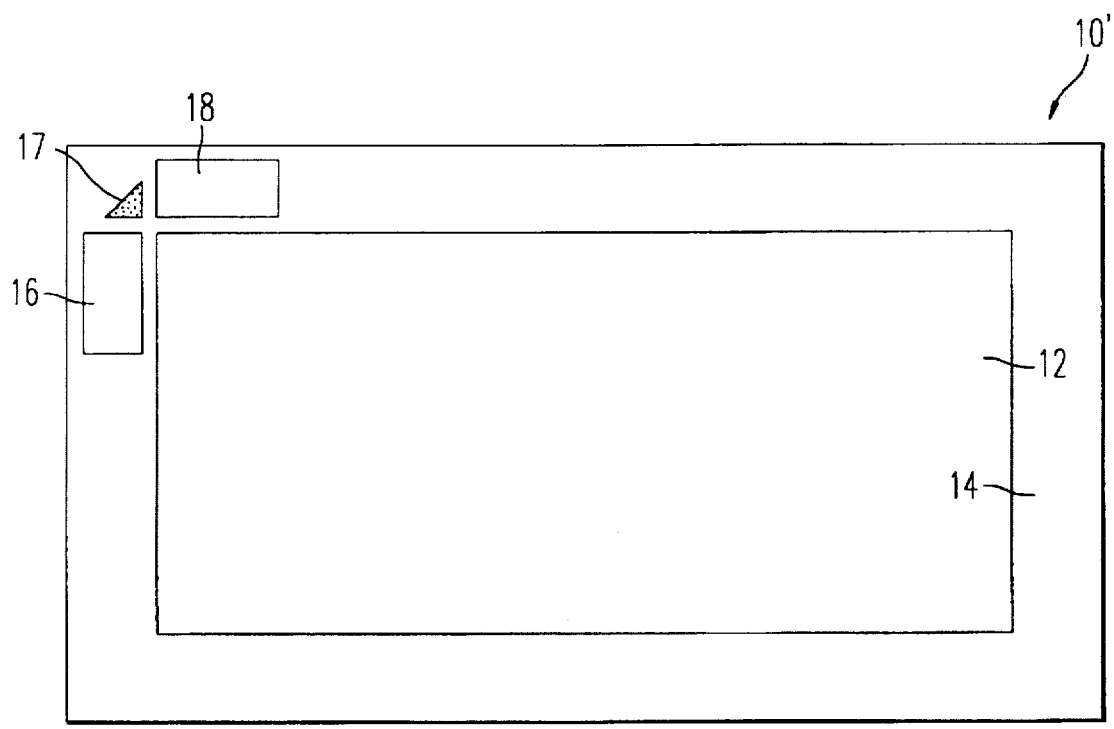

FIG. 1B illustrates an alternative arrangement of the paper support surface 10, which is designated by 10'. In FIG. 1B, the indicators 16 and 18 are arranged proximate to the upper left-hand corner so that they do not overlap. FIG. 1B also includes a corner indicator 17 which shows the corner which is to be aligned with the corner of the page to be scanned. The corner indicator is preferably printed on the periphery 14 or alternatively, is an illuminatable indicator. FIG. 1B is illustrated as not including the indicators 20 and 22, although these indicators can be included in the embodiment of FIG. 1B, if desired.

Figure 2:
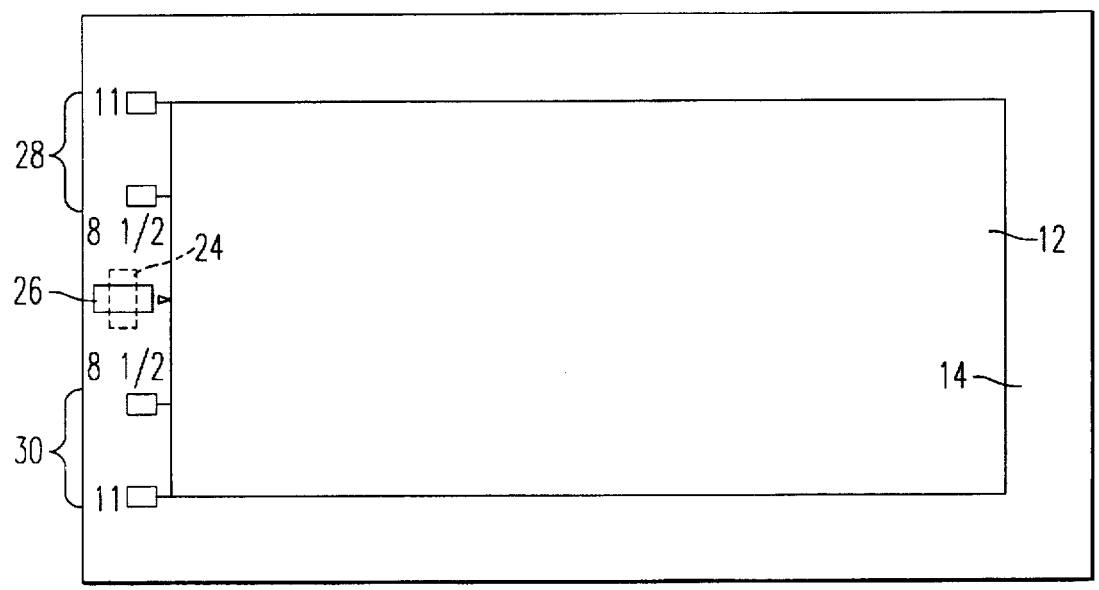
FIG. 2 illustrates an alternative paper support surface for which pages to be scanned are aligned with a center of the left edge of the contact glass.

FIG. 2 illustrates an alternative arrangement including a paper support surface 10". A difference between FIG. 2 and FIGS. 1A and 1B is that in FIG. 2, the center anchor paper position method or style is used. In this case, the left edge of the page to be scanned is centered along and aligned with the left edge of the transparent contact surface 12, although any other edge of the transparent contact surface 12 can be utilized as the anchor edge. In FIG. 2, there is illustrated paper orientation indicators 24 and 26 which operate in a similar manner and have a similar structure as the paper orientation indicators 16 and 18 in FIG. 1A. However, the paper orientation indicators 24 and 26 are preferably located at a central portion of the alignment edge of the transparent contact surface 12, although if desired, the paper orientation indicators can be arranged anywhere along the periphery 14. As in the embodiment illustrated in FIG. 1A, the paper orientation indicators 24 and 26 are illustrated as overlapping but can be arranged in a nonoverlapping manner. To the right of the orientation indicator 26, there is a mark which indicates the center of the left edge of the transparent contact surface 12.

The paper position indicators 28 and 30 illustrated in FIG. 2 are arranged in pairs so that when the paper is arranged in a landscape orientation and centered at the left edge of the transparent contact surface 12, both of the 8½ indicators are illuminated. Similarly, when an 8½ by 11 inch page is arranged in a portrait orientation, both of the 11 indicators are illuminated.

While the indicators 28 and 30 are arranged in corresponding pairs, the invention may also be constructed without the use of corresponding pairs. This may be particularly advantageous when the paper position indicators are closely spaced, for example when there are separate indicators for both 8½ by 11 inch paper and A4 size paper. In this case, for example, the 8½ indicator may be placed on one side of the orientation indicators 24 and 26 and a corresponding indicator indicating an A4 width of approximately 8¼ inches is placed below the orientation indicators 24 and 26. The illumination and structure of the indicators 28 and 30 is the same as the indicators 20 and 22 illustrated in FIG. 1A. Although FIG. 2 does not show any indicators indicating width (arranged on the horizontal region(s) of the periphery 14), width indicators can be utilized in a similar manner as illustrated in FIG. 1A.

Figure 3:
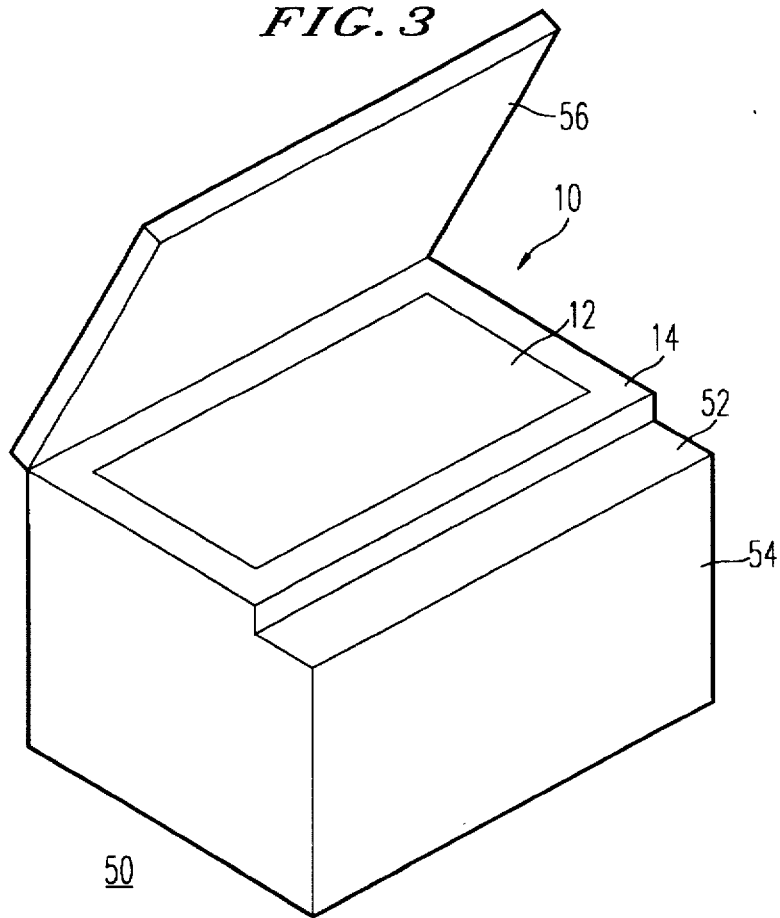
FIG. 3 illustrates a copier which is utilized with the present invention.

FIG. 3 illustrates the paper support surface 10 of either FIGS. 1A, 1B, or 2 utilized in a copier 50. The copier 50 includes a user interface 52, a body 54 which includes a scanning mechanism and a printing mechanism which may be implemented in any desired manner, and a cover 56 which preferably covers the entire paper support surface 10 but not the user interface 52, when closed. The copier body 54 includes, or has connected thereto, one or more paper trays (not illustrated). The paper trays are arranged in any desired manner and the orientation indicators and paper position indicators on the paper support surface 10 are illuminated, depending on the arrangement of paper which is to be utilized from the input or blank paper trays within or utilized by the copier 50. While the paper support surface 10 has been illustrated as being part of the copier 50, the paper support surface 10 can be utilized with any type of device which includes a scanning mechanism which scans a page which is placed on the transparent contact surface 12.

Figure 4:
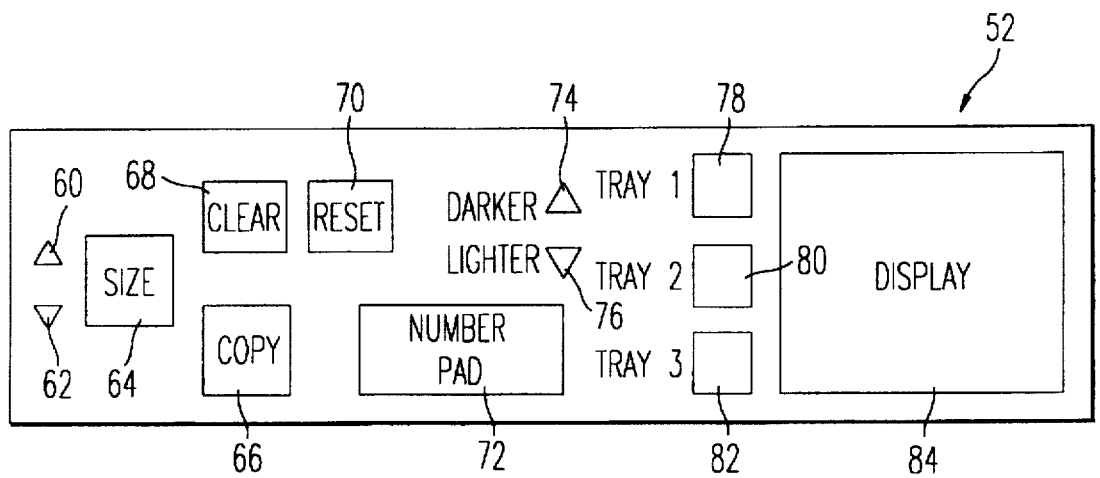
FIG. 4 illustrates the user interface including a display and input keys which is utilized with the copier illustrated in FIG. 3.

FIG. 4 illustrates the details of the user interface 52 which is part of the copier 50 illustrated in FIG. 3. The user interface 52 includes an enlargement button 60 and a reducing button which are used to increase or decrease the magnification performed by the copier. The magnification is displayed on a size indicator 64 which is implemented using LEDs or an LCD, for example. The user interface also includes a display 84 for displaying any type of information of the copier such as the parameters of the copier including the number of copies to be made, the darkness of the copies, other copying options, and diagnostic or error information of the copier including paper jams. There are three buttons 78, 80, and 82 to select three different paper trays of the copier, keys 74 and 76 to indicate whether the copy is to be made darker or lighter, a number pad 72 which includes keys to enter any of the ten digits 0-9 in order to select a number of copies, a key 70 to reset the parameters of the copier, a key 68 to clear a current copy operation, and a copy key 66.

The display 84 of the user interface 52, or the copy button 66 may include an orientation indicator which indicates how the page to be copied is to be orientated on the transparent contact surface 12. However, this is in addition to the orientation indicators which are placed on the periphery 14 of the paper support surface 10.

Figure 5:
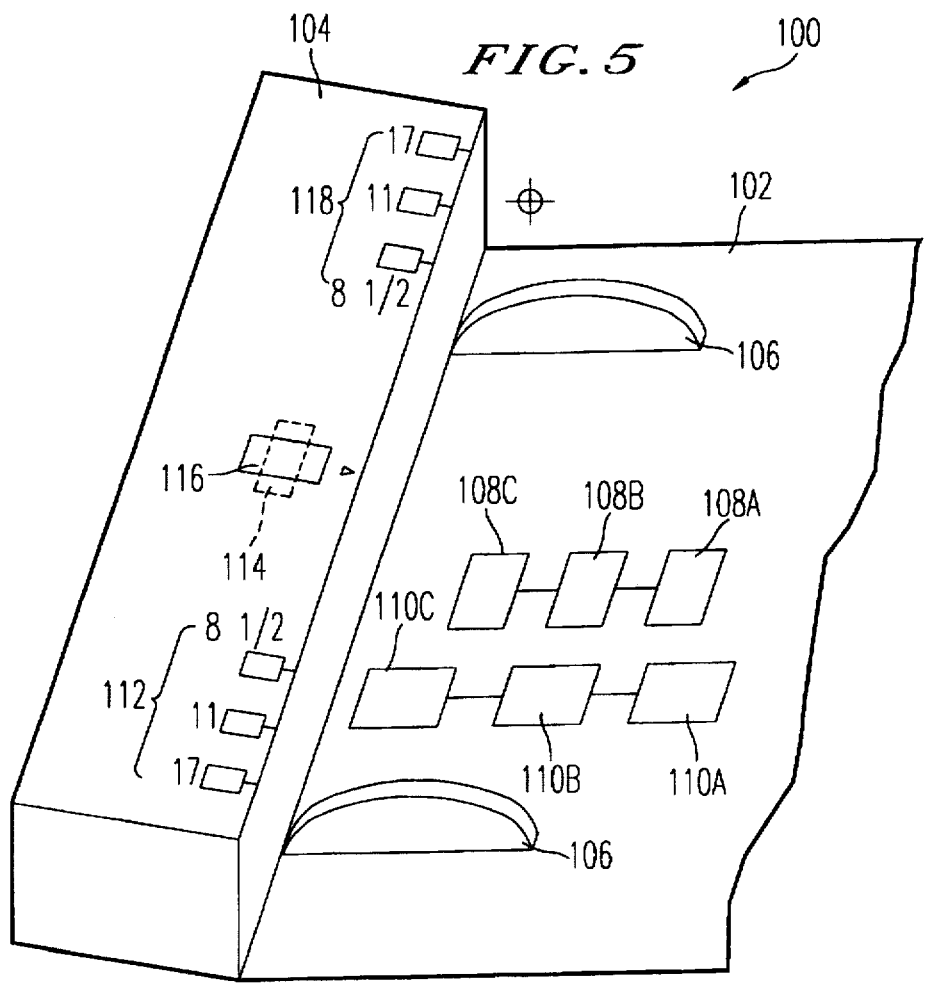
FIG. 5 illustrates a portion of an automatic document feeder which has indicators which indicate both an orientation of a page to be scanned and also where to place the edges of the page to be scanned.

FIG. 5 illustrates an alternative embodiment of the invention where the paper orientation indicators and paper position indicators are arranged on a portion 100 of an automatic document feeder used in a copier or other scanning device. The portion 100 includes a paper tray 102 on which one or a stack of pages to be scanned or copied are placed, a cover 104 under which there is located rollers and gears for feeding pages from the tray. Slidably mounted to the tray or contacting the tray are two side fences 106 which are adjustable and set to contact the upper and lower edges of pages placed on the tray 102. The orientation indicators 114 and 116, and the sets of paper position indicators 118 and 112 are structurally the same and function the same as the indicators 24, 26, 28 and 30 illustrated in FIG. 2. However, as an alternative, the indicators can be arranged on the cover 104 and/or tray 102 in order to correspond to the indicators 16, 18, 20 and 22 illustrated in FIG. 1A. Accordingly, the center anchor paper feed method does not have to be used but, for example, the lower paper fence may be fixed at a lower or near end of the paper tray 102 and paper position indicators would correspond to the upper fence 106 and if desired, a right edge of the page placed on the paper tray 102. Additionally, the indicators 112, 116, and 118 may be located on a side surface of the cover 104, instead of on an upper surface of the cover 104, as illustrated in FIG. 5.

FIG. 5 also illustrates three portrait orientation indicators 108A, 108B, and 108C and three landscape indicators 110A, 110B, and 110C on the tray 102. When the paper is to be positioned in a portrait orientation, the indicator 108A first illuminates, followed by the illumination of indicator 108B, and finally followed by the indicator 108C. In a similar manner, when the landscape mode is selected, the indicators 110A, 110B, followed by 110C sequentially illuminate. This provides the user with an indication of the paper feed direction of the automatic document feeder. As an alternative to using the three indicators on the paper tray as shown in FIG. 5, a different number of indicators such as two or four indicators may be used to indicate the feed direction, or alternatively, a single orientation indicator may be used for each of the portrait and landscape orientations. Also, while the orientation indicators on the tray 102 are illustrated as not overlapping, it is also possible for the landscape indicators to overlap the portrait orientation indicators in a manner such as is illustrated with the orientation indicators 114 and 116 on the cover 104.

Figure 6:
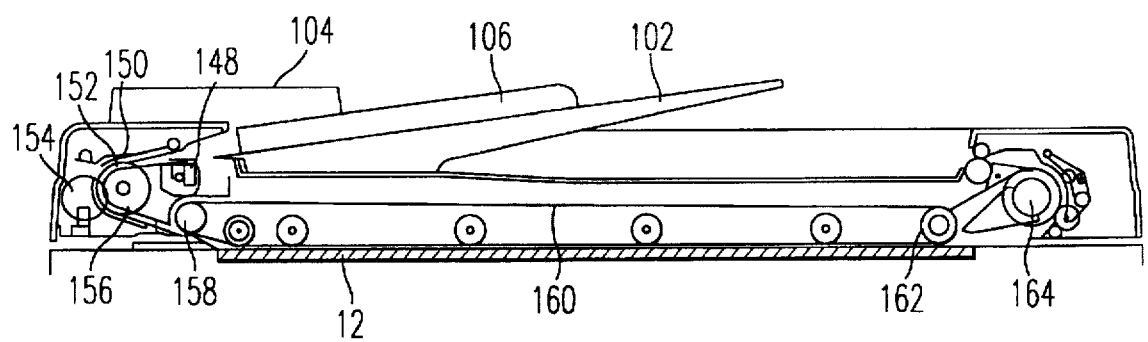
FIG. 6 illustrates a cross-sectional view of a first type of automatic document feeder utilized with the invention.

The portion 100 of the automatic document feeder in FIG. 5 can be used on any type of automatic document feeder for a scanning device. A first exemplary type of automatic document feeder which can be utilized with this invention is illustrated in FIG. 6. In this automatic document feeder, when the paper is placed on the tray 102, a sensor 148 detects the existence of the paper. A pressing member 150 pushes the paper on the tray 102 against a feed belt 152. The paper is fed on the feed belt 152 which is wrapped around a roller 156 and contacts another roller 154. The paper then travels between the belt 160 and the transparent contact surface 12. The belt 160 is driven by one or both of the end rollers 158 and 162. Depending on the position of the selector 164, the paper is either ejected back into a tray of the automatic document feeder or ejected out of a lower portion of the automatic document feeder.

Figure 7:
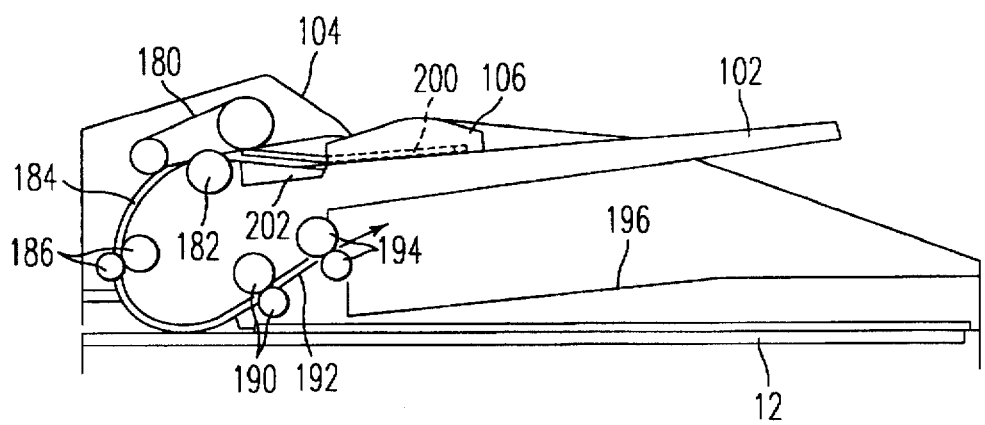
FIG. 7 illustrates a second type of automatic document feeder which can be used with the invention.

As an alternative to the automatic document feeder illustrated in FIG. 6, the automatic document feeder illustrated in FIG. 7 may be utilized with the invention. In FIG. 7, the pages 200 to be scanned are placed on the tray 102. A push-up plate 202 pushes up the pages against a belt 180. The rotation of a roller 182 and belt 180 feed the pages through paper path 184, between feed rollers 186, to a portion of the transparent contact surface 12. The rollers are then fed by the pair of feed rollers 190 through the paper path 192, and finally by the pair of feed rollers 194 to the paper eject tray 196.

In each of the automatic document feeders illustrated in FIGS. 6 and 7, one or more motors, gears, and clutches are used in order to feed the paper in a conventional or desired manner. The exact construction of the automatic document feeder utilized by the invention is not important, as long as the paper placement indicators are included on the automatic document feeder.

Figure 8A:
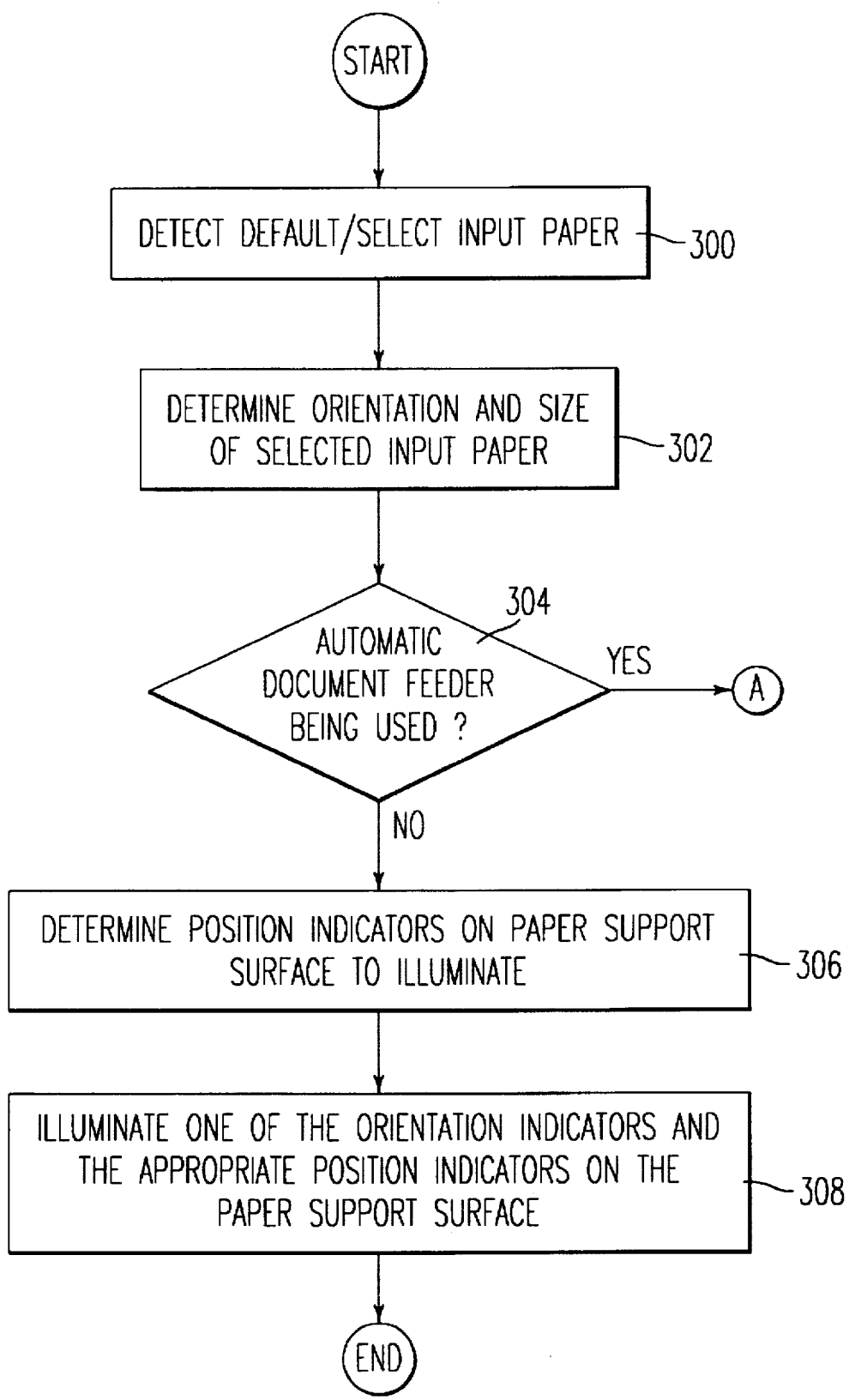

A flowchart illustrating the operation of the invention is illustrated in FIGS. 8A and 8B. First, a user either selects the input paper to be utilized with the copy operation or uses the default paper. The selection can be performed by a user choosing one of the three tray buttons 78, 80, or 82 illustrated in the user interface of FIG. 4. Ordinarily, a user will not have to select a tray button unless a paper change is desired as the copier will utilize a default paper tray, a paper tray which was most recently used, or only a single paper tray, when there is only one type of paper within the copier. In step 300, the copier detects the input paper (e.g., the paper which is to have an image copied thereto). The input paper will usually be blank but alternatively has pre-printed information such as a "Confidential" label appearing thereon. In step 302, the copier determines the orientation and size of the selected input paper. This step can be performed automatically by examining the paper which is in each tray, examining the paper tray itself, or by determining which paper tray has been selected. Alternatively, the system may store the input paper size/orientation in a table contained within a memory. Further, a user might predefine that a specific type of paper exists in a specific tray. Further, any manner of determining the orientation and size of the selected input paper can be utilized, as desired.

Step 304 then determines whether an automatic document feeder is being used. If it is not, a user is manually placing the sheets on the paper support surface and flow proceeds to step 306. In step 306, a processor within the copier automatically determines the position indicators on the paper support surface which are to be illuminated. The determination of position indicators may involve a table look-up to match the input paper with reduction or enlargement selection and to select the closest indicators for the original. By knowing the dimensions and orientation of the source ok input paper and whether the original page to be scanned is to be aligned with the center portion of an edge of the transparent contact surface or a corner of the contact surface, the position indicators which are to be illuminated can be readily determined. In step 308, one of the orientation indicators is illuminated and the appropriate position indicator(s) on the paper support surface are illuminated. The process of FIG. 8A ends.

Alternatively, if it is determined in step 304 that an automatic document feeder is to be used, flow proceeds to process A in FIG. 8B and step 320 determines the position indicators on the automatic document feeder to illuminate in a similar manner as step 306 is performed. In step 322, one of the orientation indicators is illuminated and the appropriate position indicators on the automatic document feeder are also illuminated. Next, in step 322, the appropriate set of orientation indicators are illuminated in sequence on the paper tray in order to show to a user the paper feed direction of the automatic document feeder. Each of the appropriate indicators are illuminated for a short period of time, such as one quarter to three quarters of a second, for example. The process of FIG. 8B then ends.

Figure 9:
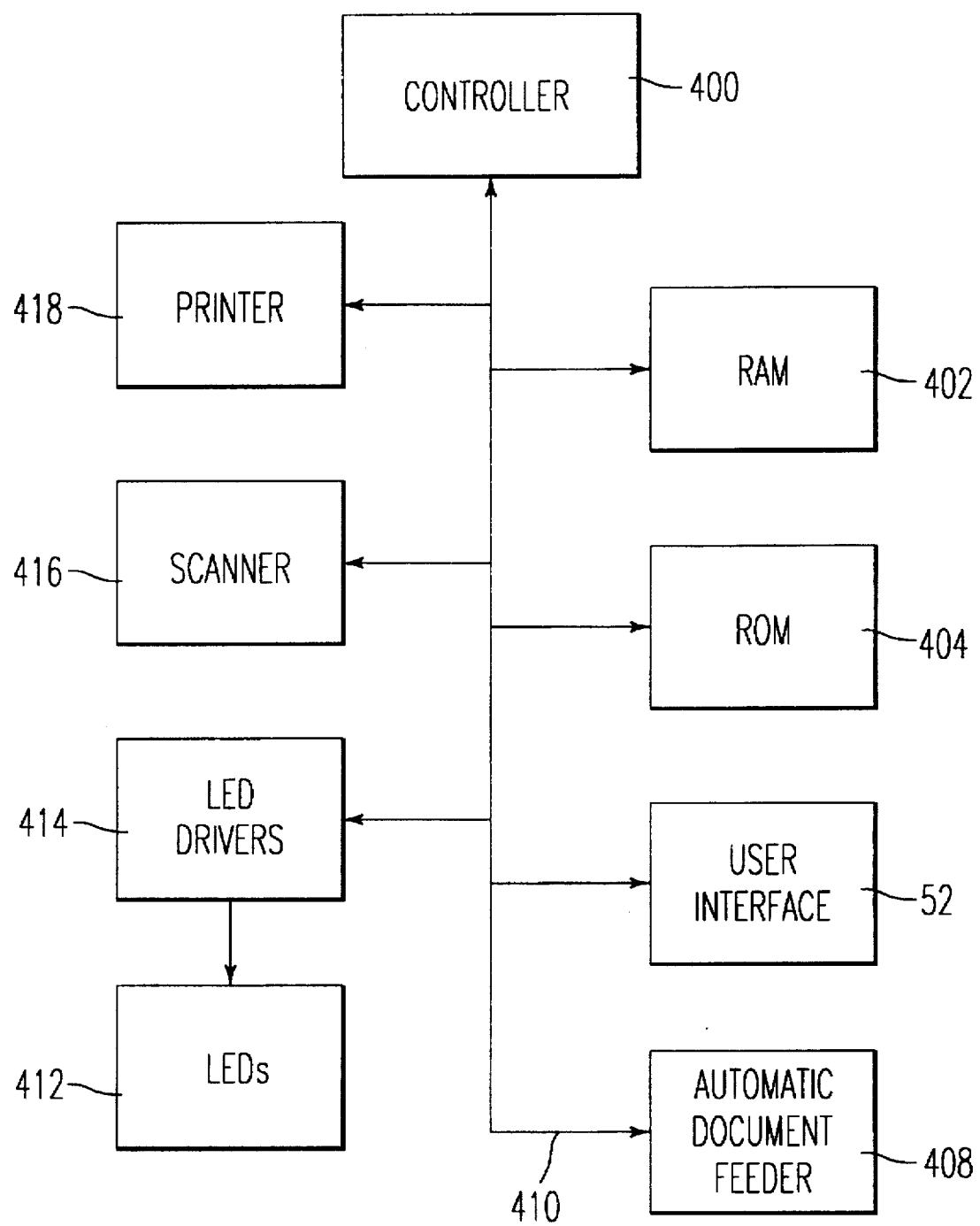
FIG. 9 illustrates an electrical block diagram of the invention.

FIG. 9 is a block diagram of the electrical components of a copier which implements the present invention. A controller 400 such as a microprocessor is used to control the operation of the copier and the illumination of the indicators.

A random access memory (RAM) 402 serves as a working memory for the copier. A read only memory (ROM) 404 is utilized to store the control program of the copier such as the program which is utilized to control the illumination of the indicators utilized by the invention. As an alternative to the ROM 404, any nonvolatile memory can be used to store the control program. The user interface 52 is also connected to the controller to input the operating parameters and control the copier along with displaying the appropriate information to a user. The automatic document feeder 408 receives commands to control the operation of the motor(s), clutches, and other components thereof. Each of the components illustrated in FIG. 9 is connected using a bus 410.

There are LED drivers 414 which are conventional driving circuitry for LEDs which are the paper orientation and position indicators. Alternatively, any type of indicator and driving circuitry can be used, as explained above. Also connected to the controller 400 through the bus 410 are a scanner 416 which may be implemented as any type of scanning mechanism and a printer 418 which can be any type of printing mechanism found in a printer or a copier such as a conventional photoconductive printing mechanism.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The invention may also be applied to a digital scanner where proper placement of an original to be scanned is required. When the invention is applied to a digital scanner, the paper size, orientation, and reduction/enlargement can be selected by a user through either an operation panel or application software.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A scanning system which indicates where to place a page to be scanned, comprising:
   a paper support surface including:
      a transparent contact surface;
      a paper orientation indicator which indicates how a user is to orient the page to be scanned on the contact surface, the paper orientation indicator representing a page and whether the page to be scanned is to be placed in a portrait or landscape orientation, the paper orientation indicator further being a miniature representation of how a user should place a page on the transparent contact surface in order for the page to be properly scanned; and
   a scanning mechanism disposed under the paper support surface.

2. A scanning system according to claim 1, further comprising:
   a plurality of illuminatable indicators, disposed around a periphery of the paper support surface, which indicate a position of where the page to be scanned is to be placed.

3. A scanning system according to claim 2, wherein:

the plurality of the illuminatable indicators are located on at least two different sides of the periphery of the paper support surface.

4. A scanning system according to claim 3, wherein:

the paper orientation indicator is located proximate to a corner of the contact surface.

5. A scanning system according to claim 2, wherein:

the plurality of the illuminatable indicators are located at a single side of the periphery of the contact surface and are arranged in pairs so that each indicator has a corresponding indicator on an opposite side of a central position of the contact surface.

6. A scanning system according to claim 5, wherein:

the paper orientation indicator is located proximate to the central position of the contact surface.

7. A scanning system according to claim 2, wherein:

the plurality of the illuminatable indicators are located at a single side of the periphery of the contact surface.

8. A scanning system according to claim 2, further comprising:

means for selecting which of the plurality of illuminatable indicators are to be illuminated.

9. A scanning system according to claim 8, further comprising:

means for selecting which of the plurality of illuminatable indicators are to be illuminated using an orientation and size of input paper which is to receive a copy of the page to be scanned.

10. A scanning system according to claim 9, further comprising:

a plurality of input paper trays;

at least one switch for selecting, by a user, from which of the plurality of input paper trays input paper is to be used for a copying operation; and a memory which stores information indicating which of the illuminatable indicators are to be illuminated, depending on which of the input paper trays is to be used for the copying operation, wherein the means for selecting which of the plurality of illuminatable indicators are to be illuminated using the orientation and size of the input paper determines which of the plurality of the input paper trays was selected by the at least one switch and the information stored in the memory which indicates which of the illuminatable indicators are to be illuminated.

11. A scanning system according to claim 2, wherein:

the plurality of paper orientation illuminatable indicators comprise:

a plurality of LEDs.

12. A scanning system according to claim 2, wherein:

the paper orientation indicator has a rectangular shape and has an orientation which indicates whether the paper is to be placed in a portrait or landscape orientation.

13. A scanning system according to claim 1, wherein:

the paper orientation indicator is located to a side of the transparent contact surface.

14. A scanning system according to claim 1, further including an automatic document feeder which indicates a proper placement for pages of a document to be scanned, the automatic document feeder comprising:

a tray for holding the pages to be scanned;

a feeding mechanism which feeds pages of the document to be scanned from the tray; and a plurality of illuminatable indicators which indicate a proper placement on the tray to place the pages to be scanned, the plurality of illuminatable indicators having rectangular shapes and having orientations which indicate whether the pages are to be placed in a portrait or landscape orientation.

15. A scanning system according to claim 14, wherein:

the paper orientation indicator of the paper support surface is illuminated only when the paper support surface is a source of a page to be scanned and one of the paper orientation indicators of the automatic document feeder is illuminated only when the automatic document feeder is used.

16. An automatic document feeder which indicates a proper placement for pages of a document to be scanned, comprising:

a tray for holding the pages to be scanned;

a feeding mechanism which feeds pages of the document to be scanned from the tray; and a plurality of illuminatable indicators which indicate a proper placement on the tray to place the pages to be scanned, the plurality of illuminatable indicators having rectangular shapes and having orientations which indicate whether the pages are to be placed in a portrait or landscape orientation.

17. An automatic document feeder according to claim 16, further comprising:

a scanning mechanism which scans pages fed by the feeding mechanism; and a printing mechanism which prints on input paper an image obtained by the scanner, wherein:

the plurality of illuminatable indicators indicate different orientations of the pages to be scanned, depending on the input paper onto which the image is printed.

18. An automatic document feeder according to claim 17, wherein:

the plurality of illuminatable indicators are located on a surface which is different from a paper tray of the automatic document feeder.

19. An automatic document feeder according to claim 17, wherein:

the plurality of illuminatable indicators are located on a surface of a paper tray of an automatic document feeder.

20. An automatic document feeder according to claim 19, wherein:

the plurality of illuminatable indicators are illuminated in sequence to indicate a feed direction of the automatic document feeder.

21. An automatic document feeder according to claim 16, wherein:

the plurality of illuminatable indicators are miniature representations of how a user should place a page on the transparent contact surface in order for the page to be properly scanned.

22. A scanning system which indicates where to place a page to be scanned, comprising:

a paper support surface means for supporting the page to be scanned including:

a transparent contact surface;

a paper orientation indicator means for indicating how a user is to orient the page to be scanned on the contact surface, the paper orientation indicator means representing a page and whether the page to be scanned is to be placed in a portrait or landscape orientation, the paper orientation indicator means further being a miniature representation of how a user should place a page on the transparent contact surface in order for the page to be properly scanned; and a scanning means for scanning the page, disposed under the paper support surface means.

23. An automatic document feeder which indicates a proper placement for pages of a document to be scanned, comprising:

a tray means for holding the pages to be scanned;

a feeding means for feeding pages of the document to be scanned from the tray; and a paper orientation indicating means for indicating a proper placement on the tray to place the pages to be scanned, the paper orientation indicating means having rectangular shapes and having orientations which indicate whether the pages are to be placed in a portrait or landscape orientation.

* * * * *